May 25, 1948. W. SPAIN 2,442,250
METHOD AND APPARATUS FOR ASSEMBLING AND HANDLING CONFECTIONS OR THE LIKE
Filed May 4, 1944 3 Sheets-Sheet 1
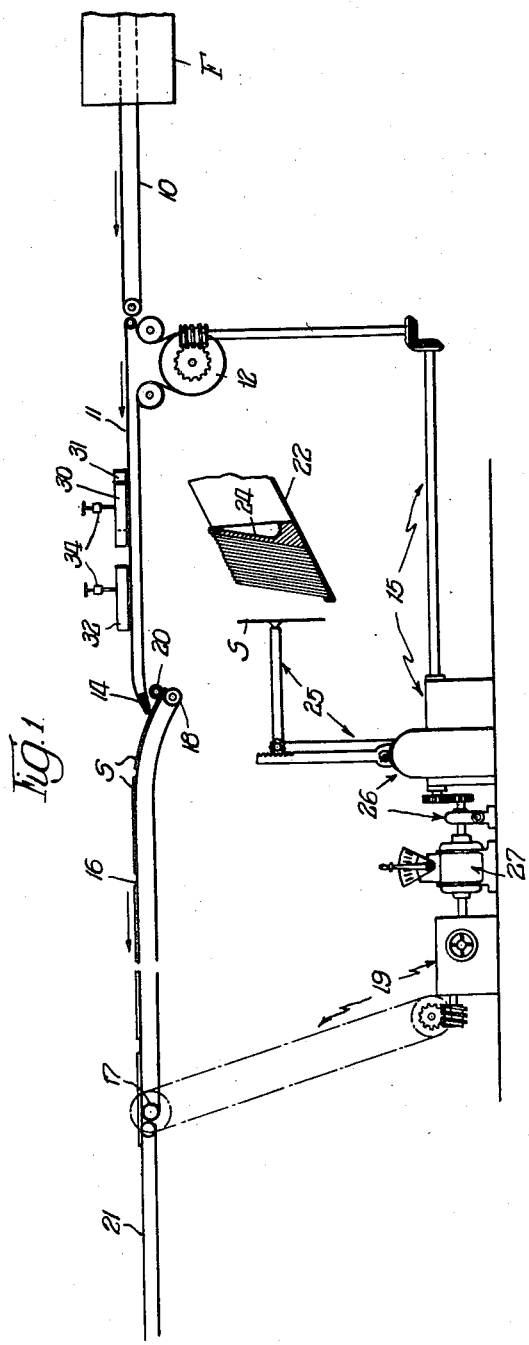
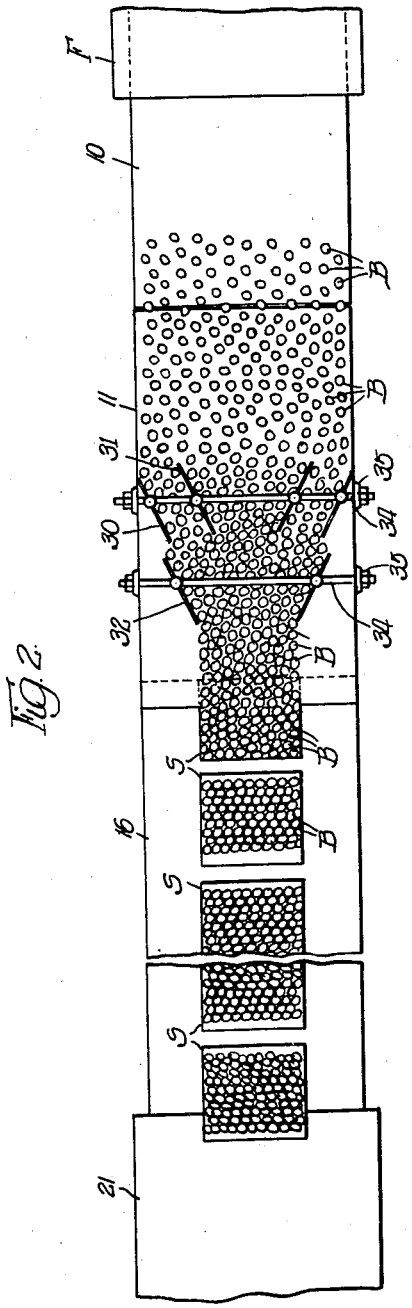
INVENTOR.
William Spain,
BY

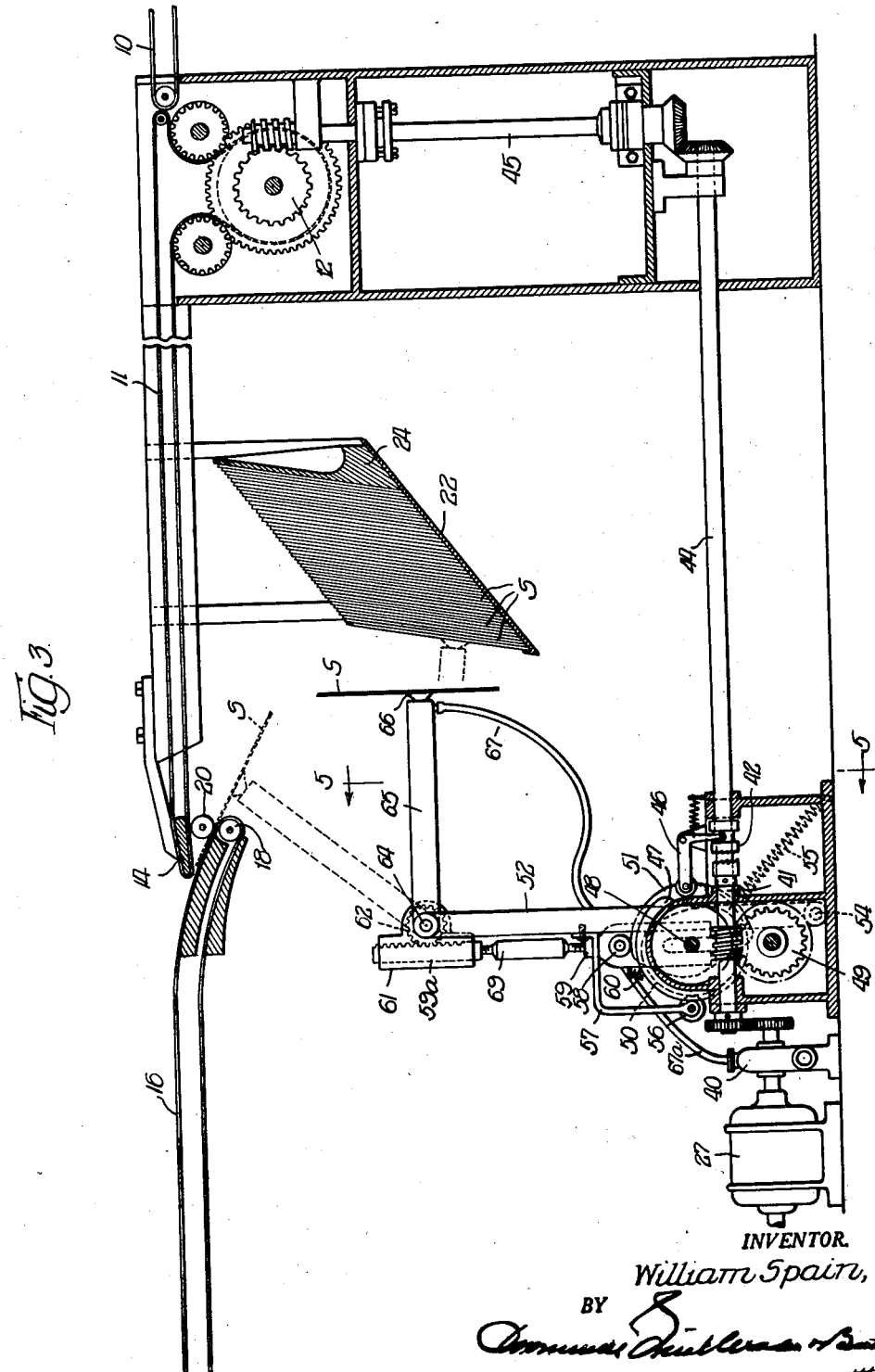

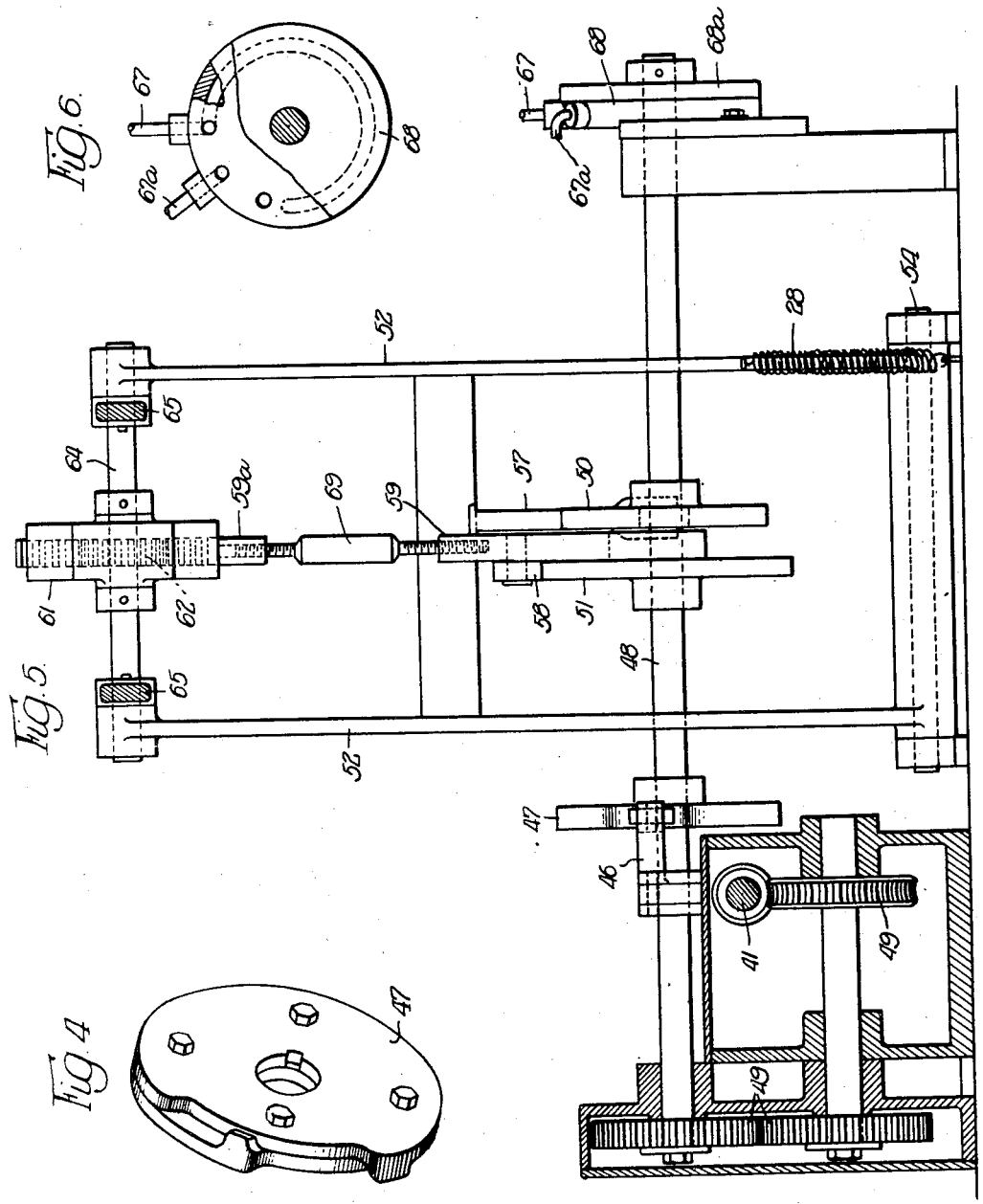

Patented May 25, 1948

2,442,250

UNITED STATES PATENT OFFICE 2,442,250

METHOD AND APPARATUS FOR ASSEMBLING AND HANDLING CONFECTIONS OR THE LIKE

William Spain, Villa Park, Ill., assignor to E. J. Brach & Sons, Chicago, Ill., a corporation of Illinois Application May 4, 1944, Serial No. 534,128

19 Claims. (Cl. 107—7)

This invention relates to method and apparatus for the assembling and handling of discrete bodies, such as pieces of candy, for packaging or for transportation in the manufacturing plant or for other purposes.

In the manufacture of candies of various kinds, individual pieces are treated in various ways to give them a certain character as to appearance and a desired finish. For example, many different kinds of candy materials are formed into discrete pieces, or centers, and these are individually coated or enrobed with chocolate or covered with other kinds of surfacing materials which may contribute a flavor characteristic, but which are particularly important for providing a pleasing and delectable appearance. The preparation and application of such coatings require careful control in order to obtain the desired results in appearance, texture and stability, and, in most instances, is completed by a carefully regulated cooling in order to set up the coating properly. Of course, the whole procedure, beginning with the selection of ingredients to go into the coating, must be accurately controlled with the purpose of producing a confection in which the coating has the proper stability but is not too hard or too tough or too stiff.

Consequently, the finish of the completed pieces is rather delicate in structure, and is subject to being marred or defaced rather easily by pressure or friction to which the pieces may be subjected in the handling incident to packaging them in boxes or to placing them on trays or receptacles for transporting them in the plant. For example, the picking up of the pieces in the fingers, even very gently, is quite likely to fingerprint them, which, of course, very seriously affects their attractiveness.

A general object of the present invention is the provision of method which may be employed effectively and efficiently in a continuously operated production line, and apparatus for performing such method automatically, whereby discrete pieces of candy may be taken directly from the finishing operation, such as the cooling referred to above, and suitably assembled in groups or allotments which may be handled as a unit for packaging in boxes or the like, without involving the handling of individual pieces or without subjecting them to pressure or abrasion such as would be likely to mar or deface their finish.

Another object is the provision of such a method and apparatus which will be effective to control the quantity or number of pieces in the several allotments in such fashion as to obtain approximate uniformity as between different allotments, thus reducing to a minimum the make-up or take-off necessary to obtain uniform weight in different boxes or packages.

Another object is to provide such method and apparatus which, as a part of its performance and operation, may be employed to arrange respective allotments, each comprising a plurality of separate pieces, on respective separator sheets, so that individual allotments may be transferred as respective units into boxes in such fashion that the respective allotments form separate layers or strata in the package.

Another object is to provide for performing such a method, an apparatus which may be accommodated or adjusted so as to handle with equal efficacy different sizes, shapes and weight of pieces, either in mixed assortments or of uniform type.

Yet another object is the provision of such a method and apparatus which can be operated with such certainty and speed as to take the output of a production line, or a plurality of production lines, and which, even though it may be put out of commission or discontinued for a period of time, while operation of the production line is continued, will not interfere with the take-off from the production line or involve any disturbance whatever of its continuing and customary operation.

Other and further objects of the invention will be pointed out or indicated hereinafter, or will be apparent to one skilled in the art upon an understanding of the invention or its employment in use.

For the purpose of aiding in an explanation of the invention, I show in the accompanying drawings forming a part of this specification, and hereinafter describe, certain forms of apparatus in which the method may be practiced, and I describe the method by reference thereto. It is to be understood, however, that these portrayals and descriptions are intended for purpose of illustration merely, and that the invention is not to be construed as limited to this particular fashion of carrying on the procedure or to the particular form of apparatus shown.

In said drawings,

Fig. 1 is a schematic side elevational view of apparatus appropriate for performing automatically the method which constitutes the present invention, and which apparatus likewise represents a machine embodying the invention;

Fig. 2 is a top or plan view of such apparatus, shown schematically and serving to illustrate certain steps or stages in the progressive performance of the method;

Fig. 3 is a part side elevational view of some parts of the apparatus shown in Fig. 1, some of the parts being shown in section;

Fig. 4 is a detail in the nature of a perspective view illustrating a type of adjustable cam which may be employed in the machine shown;

Fig. 5 is a transverse elevational view of a portion of the apparatus shown in Fig. 3, as taken on approximately line 5—5 of Fig. 3, and drawn on a somewhat larger scale; and Fig. 6 is a detail in the nature of a front elevational view, partly in section, of an air control valve.

The nature of the method and of the apparatus may be most quickly and readily explained by reference to the accompanying drawings.

Let it be understood that the reference character F is meant to designate the discharge end of a production line, and in this instance may represent the end of a cooler through which a continuously running belt 10 passes, which belt receives the pieces of candy from an enrober or other forming or finish-applying machine, not shown, and transports the pieces through the cooler in order to set up their coating or finish. It is to be understood that the parts may apply likewise to the discharge end of any other finishing or fabricating apparatus which delivers the pieces on the belt 10 at the end of F in condition for packaging or further handling in the plant. The belt 10, being directly related to the enrobing or fabricating machine or machines, is actuated continuously in timed relationship to their operation, and its upper flight moves in the direction of the associated arrow. The element exemplified by the belt 10 will be referred to as the leading-on means or the leading-on conveyor.

Associated with the discharge end of the leading-on conveyor is a transfer conveyor 11, here represented as an endless belt entrained around a driving sheave 12 and a nose bar 14, and driven intermittently in the direction indicated by its arrow, by driving means designated generally by the reference character 15. Associated with the discharge end of the transfer conveyor 11 is a leading-off conveyor 16 which is entrained around rollers 17 and 18 and is driven continuously, in the direction indicated by the arrow, through the medium of actuating means designated generally by the reference character 19. A holding-down roller 20 rides on the belt against the roller 18, and a take-off belt 21 may be arranged to receive articles from the discharge end of leading-off belt 16.

The element designated by the reference numeral 22 is a chute down which sheets of cardboard or the like in generally upright position may be fed by gravity under the pressure of a follower 24. A sheet feeder designated generally by reference character 25 and operated by sheet feeding mechanism 26 is adapted to pick off sheets individually from chute 22 and swing them upward onto leading-off conveyor 16 in the bite between the rollers 18 and 20. Driving means 27 is arranged to drive actuating means 15 and 19 and sheet feeding mechanism 26 in timed relation. Leading-on conveyor 10 is driven continuously at constant speed. Transfer conveyor 11 is driven intermittently, and at a rate of speed slower than that of the leading-on conveyor. Leading-off conveyor 16 may be driven at the same speed as conveyor 11 or at a lesser rate. Rollers 18 and 20 rotate constantly in accordance with the speed of leading-off conveyor 16. Take-off conveyor 21, if used, may be run at the same or greater speed than leading-off conveyor 16.

In Fig. 2 is illustrated schematically a top view of the apparatus above described. The numerous ovoids designated in general by the reference character B exemplify discrete bodies such as individual pieces of candy. As delivered from the enrober or forming apparatus, these bodies are spaced liberally from one another, both in the longitudinal direction of their travel and in directions transverse thereto, and they are carried through the cooler or finishing apparatus in that relationship in order to prevent the sticky coatings or surfaces of the discrete bodies from coming into contact and adhering to one another, and to afford liberal access of air to the entire exposed surface of each piece. Consequently, they are shown on the leading-on conveyor 10 in liberally spaced relationship. They remain in this relationship until they reach the receiving end of transfer conveyor 11. Inasmuch as this conveyor is driven at a speed slower than that of conveyor 10, the bodies, upon their reaching it, are retarded, while those following and which are still on conveyor 10 continue at the higher rate and thus partially catch up with those which have reached conveyor 11, and partially close the intervening spaces in the direction of travel. Of course, this catching up is more pronounced during the pause periods of conveyor 11 than during its period of movement, with the result that the pieces pushed onto conveyor 11 by conveyor 10 during the pause periods will tend to crowd those immediately ahead of them forward somewhat, and this may cause some lateral displacement and thereby serve to close up the transverse or lateral spacing somewhat. Movement of transfer conveyor 11 advances the bodies upon it to and past a plurality of deflectors 30, 31 and 32 which are adjustably mounted on bars 34 that are carried in brackets 35 which are adjustable longitudinally of the conveyor 11. The deflectors are adjustable angularly relative to the bars 34 and are also adjustable on said bars toward and from the median line of conveyor 11, and they are supported in such relationship that their lower margins barely clear the surface of the conveyor 11. These deflectors are arranged in relationship such that those on opposite sides converge in the direction of the movement of the conveyor 11. Consequently, the bodies B in passing between the converging deflectors 30 are deflected toward the median line of the conveyor and thus moved in closer relationship with one another in the direction transversely of the conveyor. To avoid the imposition of excessive pressures upon the pieces incident to such rearrangement, and to avoid their being shuffled onto one another, this lateral shifting is done piecemeal as regards the width of the stream of bodies which are brought to the deflectors by the conveyor 11. The inner deflectors 31 take only the medial portion of the stream and move the bodies laterally toward one another, while they move progressively, whereas the portions of the stream which are between the deflectors 30 and 31 are moved inwardly somewhat relative to one another, but without imposing any adjustment on those between the deflectors 31. Then, upon reaching the deflectors 32, those which have passed between deflectors 30 and 31 are moved on farther inwardly so as to close them toward those discharged between the deflectors 31. Thus the bodies on the conveyor 11 are gradually and gently moved into rather intimate association with one another, in a relationship where their density or number per unit of surface is fairly uniform, the stream being condensed from approximately the width of conveyor 11 to approximately half of its width, in the arrangement here illustrated. Of course, the deflectors and other factors of the operation may be adjusted to vary the rate of this procedure and the distance to which the pieces are moved and the density or closeness of their relationship, as for the handling of pieces of different sizes or shapes, to accommodate the gathering and arranging operation to the disposal in which the pieces are presented by the leading-on conveyor 10.

Upon reaching the forward turning end of transfer conveyor 11, the pieces will be discharged from the compacted or narrowed stream onto the leading-off conveyor 16, which runs continuously but at a slower speed than the intermittently operating conveyor 11. However, with proper timing of the actuating means, sheet feeding means 25, which is synchronized with the operation of the intermittently operated conveyor 11, moves a support sheet S from chute 22 onto belt 16 under pressing roller 20 at intervals such that during successive pause periods of conveyor 11, successive sheets will have been fed by and on continuously running conveyor 16 to a position where their leading edges will have advanced slightly beyond the turning point or dumping point of conveyor 11. Then, during the ensuing feed period of conveyor 11, the bodies from the laterally condensed stream thereon will be transferred onto a positioned sheet, and in instances where conveyor 16 is driven somewhat more slowly than conveyor 11, there will be some further condensation or spacial adjustment of the bodies in the direction of feed. The feeding movement of conveyor 11 is stopped in each instance slightly before the trailing margin of the positioned sheet reaches the delivery end of conveyor 11. Accordingly, each sheet in passing the delivery end of conveyor 11 receives an allotment of bodies in closely assembled relationship, but with narrow areas of the sheets along their leading and trailing margins unoccupied by the bodies. The proportion of unoccupied area is somewhat exaggerated in the illustration. Likewise, due to the intermittent operation of conveyor 11 and the synchronized timing of the sheet feeding mechanism, a space or clearance is left between the successive sheets on conveyor 16. This arrangement of clearances between adjacent sheets and unoccupied front and rear marginal portions of respective sheets is provided for in order to afford handling space in which the front and rear margins of respective sheets can be grasped by the fingers of an attendant who stands at the side of conveyor 16, so that the sheet may be lifted with the allotment of bodies which it carries and placed as a unit in a box for packaging or in a tray for transportation at the plant. Of course, this lifting off may be done from conveyor 16, or the sheets with their apportionments may be permitted to proceed to take-off conveyor 21, and the units lifted off from it.

From the foregoing it will be evident that the handling of the candy for the packing of a box for sale, and the loading of a tray or the like, may be accomplished by this method without any appreciable amount of manual handling of the pieces, the only manual handling involved in the packing of a box being the addition or taking off of the three or four pieces requisite to bring the package to the desired weight, which handling can be done very expeditiously with spatulas. It will also be appreciated that by this method the handling of a given quantity of candy can be accomplished more accurately and more rapidly and at substantially less cost than is possible in customary methods where the pieces are picked up by hand, three or four pieces at a time, or where they are swept laterally off of the belt by the arm of the operator. Perhaps most important is the avoidance of handling which may deface or mar or finger mark the surface finish of the pieces. By suitable regulation of the speeds of the transfer and leading-off conveyors, the positions and numbers of the deflectors, etc., the relative movement of the pieces on the conveyors may be so controlled that none of them is subjected to injurious abrasion or pressures from others and so that there will be no piling up of the pieces upon one another and so that upsetting of the pieces will be largely avoided. It will be understood, of course, that to minimize the pressure required to shift the pieces, the several conveyors should have smooth and non-absorbent surfaces to which the pieces will not adhere strongly and on which they can be moved by light lateral pressure.

It will be understood that the procedure as carried on by the apparatus above described may be varied in any particulars suitable to accommodate it to the handling of pieces of different weights and different sizes and different shapes. For example, the fundamental speed of the apparatus may be varied by varying the speed of the motor 27 and the speed of the leading-off conveyor may be varied relative to that of the transfer conveyor by means of a suitable speed-changing device included in the actuating means 19, and the timing of the sheet feeding mechanism 25 may be varied by adjustment or interchange of various of its motion-transmitting parts.

It will be understood also that the mechanism may be adjusted so as to carry on the method in such fashion as to load simultaneously a plurality of support sheets positioned side by side on the leading-off conveyor 16, and that the condensation or positioning of the bodies on the transfer conveyor 11 and on the support sheets may be accomplished without use of the deflectors, as by running the conveyor 11 at a speed sufficiently slower than that of conveyor 10, and conveyor 16 at a speed sufficiently slower than that of conveyor 11, such as to permit a suitably close association of the pieces to be obtained by the longitudinal feeding movement at the points of transfer from conveyor to conveyor, where the more rapidly moving pieces can be moved into unoccupied spaces between preceding pieces whose progressive movement has been retarded.

It will be understood that the method may be carried on automatically by the apparatus above described as a part of a continuous production line operation and without imposing any drag or limitations on the fabricating operations which precede it in the line. This leaves entirely unhampered the control of such critical operations as the coating and cooling, as they may be regulated entirely without reference to the ensuing operations constituting the present method.

For a more detailed explanation of apparatus embodying the invention, reference is made to Figs. 3 to 6 inclusive. In the particular apparatus here shown, the continuously running motor 27 operates a pump 40 and a driving shaft 41. The latter, through a clutch having a shiftable jaw member 42, is adapted to drive transmission shafts 44 and 45 which rotate sheave 12 to actuate transfer conveyor 11. The intermittent movement of conveyor 11 is regulated by the engaging and disengaging of the clutch, which is accomplished by its throwing lever 46 which is swung periodically by a throwing cam 47. Cam 47 is carried on cam shaft 48, which shaft is driven from driving shaft 41 through the medium of a transmission train 49. Cam shaft 48 carries also a frame-rocking cam 50 and an arm-swinging cam 51, through the medium of which the sheet feeding members are actuated.

The sheet feeding mechanism comprises a rocking frame 52 which is hinged at 54 to swing from an upright position toward and from the chute 22, being swung toward the chute by springs 55 and being swung to and held in upright position by action of rocking cam 50 on cam roller 56 which is carried on an arm 57 attached to the frame 52. Arm-swinging cam 51 acts against a roller 58 carried on a rack bar 59 which is drawn downwardly by spring 60 and carries at its upper end a rack 59a. Rack bar 59 is bifurcated at its lower end to straddle cam shaft 48 and so that it may rock and shift upwardly and downwardly relative thereto and follow the swinging movement of frame 52. At its upper end the rack bar is guided in a housing 61 by which it is held in mesh with a pinion 62 that is keyed to arm-swinging shaft 64 rotatably journaled in frame 52. A plurality of sheet lifting arms 65 is keyed to shaft 64 and at their outer ends carry suction cups 66 which are connected with pump 40 through the medium of flexible tubes 67—67a and valve 68. Valve 68 includes a rotary port member 68a which is rotated by cam shaft 48 to open and close communication between pump 40 and suction cups 66.

By the mechanism described and by the timing of the cams 47, 50 and 51 and valve port member 68a, the sheet feeding mechanism is actuated in synchronism with operation of transfer conveyor 11. The sheet lifting arms 65 being in their lowered, or approximately horizontal, positions, frame 52 is rocked toward chute 22 until suction cups 66 come into contact with the surface of the endmost sheet or sheets in the chute. Communication between cups 66 and air suction pump 40 thereupon being established, the contacted sheet or sheets are held to the cups by air pressure and are withdrawn from the chute when the frame 52 is swung back toward its vertical position and arms 65 are swung upwardly to delivery position, as shown in dotted lines in Fig. 3, in which position the upper margins of the sheet or sheets are introduced into the bite between belt 16 and roller 20 opposite roller 18. Thereupon air is admitted to the cups by the valve 68 and the sheet or sheets are released and are carried forward by the movement of belt 16 to receive allotment of bodies from conveyor 11 as above described. The swinging of arms 65 to and from delivery positions is accomplished by reciprocation of rack bar 59, upward movement of the bar being impelled by its cam 51 and downward traction of it by spring 60. The duration of the pause periods of intermittently actuated conveyor 11 may be selectively varied by adjustment of the angular extent of the active margins of cam 47, which may be of the conventional adjustable type illustrated in Fig. 4. The other cams may be of similar type for selective variation of their effectiveness, and the relationship of rack bar 59 and pinion 62, and hence of position of arms 65, relative to other portions and timing of the apparatus, may be selectively varied by suitable means, as exemplified by turnbuckle 69. It will be understood, of course, that the chute 22 may be constructed with a plurality of longitudinal partitions for subdividing it into compartments to handle sheets of different sizes and to provide a plurality of sheets in side-by-side relationship for transfer to the delivery position simultaneously, and while only two of the sheet handling arms 65 are here illustrated, it will be understood that a greater number may be employed.

It will be understood, furthermore, that various changes and adaptations may be made in the apparatus, and that apparatus of quite different character may be utilized for performance of the method, all without departing from the spirit of the invention or the scope of the appended claims.

What I claim is:

1. A method of arranging discrete bodies for packaging, transportation and the like, which comprises progressively and intermittently conveying individually movable discrete bodies in scattered and spaced relationship to one another in a horizontal plane, retarding the progressive movement of said bodies in their direction of travel by intermittently stopping the movement of said bodies and continuing to advance those bodies which follow them in said horizontal plane until they catch up with those that have been intermittently stopped to close the intervening spaces between said bodies by crowding and pushing each other together in their direction of travel to form a condensed and rearranged stream of said bodies traveling in said horizontal plane and depositing groups of the rearranged and condensed stream of bodies formed solely by the intermittent movement of said bodies on individually movable supporting sheets in the course of their progressive movement.

2. A method as specified in claim 1 and wherein the bodies are moved progressively in different stages and in approximately a common horizontal plane in each stage.

3. A method as specified in claim 1 and wherein the bodies are moved progressively in successive stages, continuously in the first stage, intermittently in a second stage and continuously in a third stage.

4. A method as specified in claim 1 and wherein the bodies are moved progressively in successive stages at different speeds, the speed of progressive travel decreasing from stage to stage.

5. A method as specified in claim 1 and wherein the bodies are moved progressively in successive stages and are deposited on supporting sheets in passing from one stage to another.

6. A method of arranging discrete bodies for packaging, transportation and the like, which comprises progressively and intermittently conveying individually movable discrete bodies in scattered and spaced relationship to one another in a horizontal plane, retarding the progressive movement of said bodies in their direction of travel by intermittently stopping the movement of said bodies and continuing to advance those bodies which follow them in said horizontal plane until they catch up with those that have been intermittently stopped to close the intervening space between said bodies by crowding and pushing each other together in their direction of travel to form a condensed and rearranged stream of said bodies traveling in said horizontal plane and depositing groups of the rearranged and condensed stream of bodies formed solely by the intermittent movement of said bodies on individually movable supporting sheets in the course of their progressive movement by feeding the respective supporting sheets upwardly at an angle to gather on their leading edges the first row of a group of bodies and having the trailing marginal edges of said sheets raised upwardly to gather the last row of bodies of said group after collecting the center rows of the group on said sheet, whereby said bodies are prevented from tumbling and upsetting.

7. A method of arranging discrete bodies for packaging, transportation and the like, which comprises progressively and intermittently conveying individually movable discrete bodies in scattered and spaced relationship to one another in a horizontal plane, retarding the progressive movement of said bodies in their direction of travel by intermittently stopping the movement of said bodies and continuing to advance those bodies which follow them in said horizontal plane until they catch up with those that have been intermittently stopped to close the intervening spaces between said bodies by crowding and pushing each other together in their direction of travel to form a condensed and rearranged stream of said bodies traveling in said horizontal plane, and depositing groups of the rearranged bodies on a plurality of individually movable supporting sheets simultaneously in the course of their progressive movement.

8. A method of arranging discrete bodies for packaging, transportation and the like, which comprises progressively and intermittently conveying individually movable discrete bodies in scattered and spaced relationship to one another in a horizontal plane, retarding the progressive movement of said bodies in their direction of travel by intermittenly stopping the movement of said bodies and continuing to advance those bodies which follow them in said horizontal plane until they catch up with those that have been intermittently stopped to close the intervening spaces between said bodies by crowding and pushing each other together in their direction of travel to form a condensed and rearranged stream of said bodies traveling in said horizontal plane, depositing groups of the rearranged and condensed stream of bodies formed solely by the intermittent movement of said bodies on individually movable supporting sheets in the course of their progressive movement, moving the respective supporting sheets progressively while depositing the bodies upon them, and thereafter moving the sheets severally to transport the groups of bodies which they carry.

9. A method of arranging discrete bodies for packaging, transportation and the like, which comprises progressively and intermittently conveying individually movable discrete bodies in scattered and spaced relationship to one another in a horizontal plane, retarding the progressive movement of said bodies in their direction of travel by intermittently stopping the movement of said bodies and continuing to advance those bodies which follow them in said horizontal plane until they catch up with those that have been intermittently stopped to close the intervening spaces between said bodies by crowding and pushing each other together in their direction of travel to form a condensed and rearranged stream of said bodies traveling in said horizontal plane, depositing groups of the rearranged and condensed stream of bodies formed solely by the intermittent movement of said bodies on individually movable supporting sheets in the course of their progressive movement, and moving the sheets progressively in a series and depositing the bodies upon them seriatim in the course of progressive movement of the sheets.

10. A method of arranging discrete bodies for packaging, transportation and the like, which comprises progressively and intermittently conveying individually movable discrete bodies in scattered and spaced relationship to one another, moving some of the bodies transversely of their direction of progressive travel in the course of their progressive movement simultaneously with the transverse moving of said bodies, retarding the progressive movement thereof in their direction of travel by intermittently stopping the movement of said bodies and continuing to advance those bodies which follow them in said horizontal plane until they catch up with those that have been intermittently stopped to close the intervening spaces between said bodies by crowding and pushing each other together in their direction of travel to form a condensed and rearranged stream of said bodies traveling in a horizontal plane, and depositing groups of the rearranged bodies on individually movable supporting sheets in the course of their progressive movement.

11. A method of arranging discrete bodies for packaging, transportation and the like, which comprises progressively and intermittently conveying individually movable discrete bodies in scattered and spaced relationship to one another in a horizontal plane, retarding the progressive movement of said bodies in their direction of travel by intermittently stopping the movement of said bodies and continuing to advance those bodies which follow them in said horizontal plane until they catch up with those that have been intermittently stopped to close the intervening spaces between said bodies by crowding and pushing each other together in their direction of travel to form a condensed and rearranged stream of said bodies traveling in said horizontal plane and depositing groups of the rearranged and condensed stream of bodies formed solely by the intermittent movement of said bodies on individually movable supporting sheets in the course of their progressive movement by moving the sheets in the direction of travel of the bodies to positions underneath and in supporting contact with said bodies.

12. Apparatus for arranging discrete bodies for packaging, transportation and the like, which comprises a first conveyor traveling in a substantially horizontal plane adapted to support and transport a plurality of discrete bodies progressively in approximately a common plane, a second conveyor having one end adjacently aligned with an end of said first conveyor arranged to receive bodies from the first conveyor and transport them progressively in the same general direction said second conveyor traveling constantly in the same horizontal plane as said first conveyor and around a fixed tapered nose bar to keep said bodies traveling in substantially the same horizontal plane and actuating means whereby the second conveyor is actuated to transport the bodies at a lower rate than they are transported by the first conveyor.

13. Apparatus for arranging discrete bodies for packaging, transportation and the like, comprising a first conveyor traveling in a horizontal plane adapted to carry a plurality of discrete bodies in spaced relationship in approximately a common plane, means for actuating said conveyor continuously to transport the carried bodies progressively, a second conveyor arranged to receive the bodies from the first conveyor and carry them in approximately a common plane, said second conveyor having its upper flight traveling constantly in a horizontal plane and around a fixed nose bar, and means for actuating the second conveyor intermittently and independently of said first conveyor to transport the bodies thereon progressively in the same general direction at a slower rate than they are transported by the first conveyor.

14. Apparatus for arranging discrete bodies for handling, comprising a first conveyor for supporting a plurality of discrete bodies in approximately a common plane, actuating means for actuating said first conveyor intermittently to transport bodies thereon progressively and in spaced apart groups, a second conveyor arranged to receive bodies from the first conveyor, and sheet feeding means for feeding sheets between the second and first conveyor onto the second conveyor to receive bodies from the first conveyor as they pass therefrom to the second conveyor, said sheet feeding means comprising a movable frame having pivotally mounted thereon a sheet lifting arm adapted to move into operative association with a stack of sheets, said arm having gripping means whereby to select one of said sheets, and means adapted pivotally to swing said arm into position to deliver said sheet onto said second conveyor.

15. Apparatus as specified in claim 14 and wherein the first conveyor is actuated intermittently to transport bodies thereon progressively and the sheet feeding means is synchronized with the movement of the first conveyor.

16. Apparatus for arranging discrete bodies for handing, comprising a first conveyor for supporting a plurality of discrete bodies in approximately a common plane, actuating means for actuating said first conveyor intermittently to transport bodies thereon progressively and in spaced apart groups, a second conveyor arranged to receive bodies from the first conveyor, sheet feeding means for feeding sheets between the second and first conveyor onto the second conveyor to receive bodies from the first conveyor as they pass therefrom to the second conveyor, and means for actuating the second conveyor to transport sheets thereon away from the first conveyor.

17. Apparatus for arranging discrete bodies for handling, comprising a first conveyor for supporting a plurality of discrete bodies in approximately a common plane, actuating means for actuating said first conveyor intermittently to transport bodies thereon progressively and in spaced apart groups, a second conveyor arranged to receive bodies from the first conveyor, sheet feeding means for feeding sheets between the second and first conveyor onto the second conveyor to receive bodies from the first conveyor as they pass therefrom to the second conveyor, and means for actuating the first conveyor intermittently and the second conveyor continuously, to transport bodies on them progressively in the same direction.

18. Apparatus for arranging discrete bodies for handling, comprising a first conveyor for supporting a plurality of discrete bodies in approximately a common plane, actuating means for actuating said first conveyor intermittently to transport bodies thereon progressively and in spaced apart groups, a second conveyor arranged to receive bodies from the first conveyor, sheet feeding means for feeding sheets between the second and first conveyor onto the second conveyor to receive bodies from the first conveyor as they pass therefrom to the second conveyor, and means for actuating the first conveyor intermittently and the second conveyor continuously but at a lower rate of travel, to transport bodies on them in the same direction.

19. Apparatus for arranging discrete bodies for handling, comprising a first conveyor for supporting a plurality of discrete bodies in approximately a common plane, actuating means for actuating said first conveyor intermittently to transport bodies thereon progressively and in spaced apart groups, a second conveyor arranged to receive bodies from the first conveyor, sheet feeding means for feeding sheets between the second and first conveyor onto the second conveyor to receive bodies from the first conveyor as they pass therefrom to the second conveyor, and means cooperating with said first conveyor to deflect bodies thereon in sidewise directions in the course of their progressive travel.

WILLIAM SPAIN.

REFERENCES CITED

The following references are of record in the file of this patent:

UNITED STATES PATENTS

| Number | Name | Date |
|---|---|---|
| 612,773 | Harton | Oct. 18, 1898 |
| 863,349 | Bleile | Aug. 13, 1907 |
| 1,111,549 | Staffel | Sept. 22, 1914 |
| 1,112,184 | Allison et al. | Sept. 29, 1914 |
| 1,703,881 | Greer | Mar. 5, 1929 |
| 1,709,189 | Radtke | Apr. 16, 1929 |
| 1,718,443 | Straight | June 25, 1929 |
| 1,755,721 | Winkler | Apr. 22, 1930 |
| 1,988,744 | Marresford | Jan. 22, 1935 |
| 2,184,905 | Brintnall | Dec. 26, 1939 |
| 2,314,431 | Strike | Mar. 23, 1943 |
| 2,392,746 | Labombarde | Jan. 8, 1946 |

Certificate of Correction

Patent No. 2,442,250.

May 25, 1948.

WILLIAM SPAIN

It is hereby certified that error appears in the printed specification of the above numbered patent requiring correction as follows: Column 11, line 8, claim 13, after the word "conveyor" insert *having one end adjacently aligned with an end of said first conveyor*; and that the said Letters Patent should be read with this correction therein that the same may conform to the record of the case in the Patent Office.

Signed and sealed this 14th day of September, A. D. 1948.

[SEAL]

THOMAS F. MURPHY,
*Assistant Commissioner of Patents.*